3,007,694
HYDRO-PNEUMATIC SUSPENSION STRUT
Lester Benjamin Bingaman, Hust, Tex., assignor to
Bert Fields, Dallas, Tex.
Filed Nov. 4, 1958, Ser. No. 771,834
1 Claim. (Cl. 267—64)

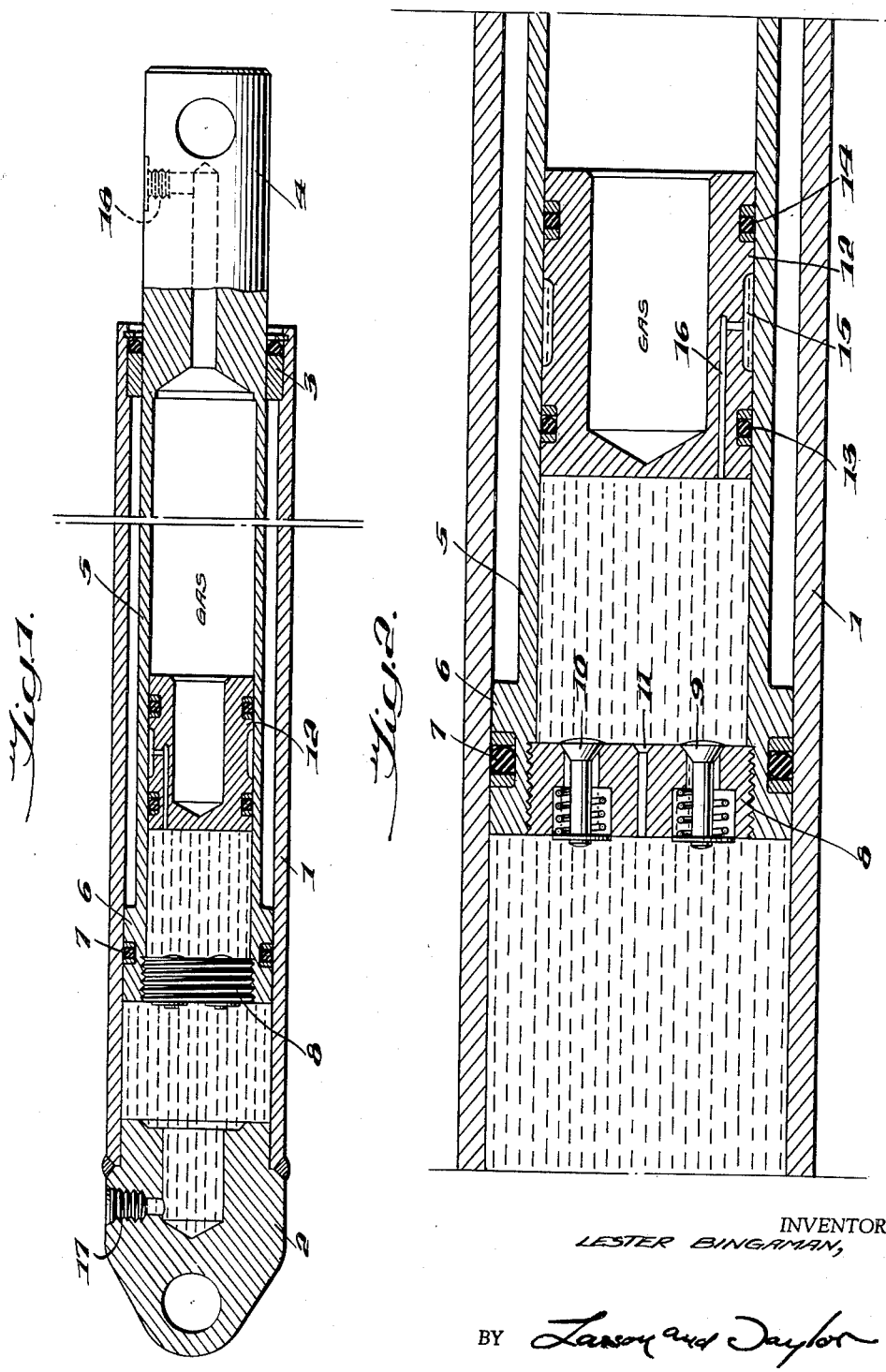

This invention relates to a hydro-pneumatic suspension strut and more particularly to a strut which is adapted to be adjustable in length, and which has shock absorbing characteristics.

In certain types of vehicles it has been found desirable to provide a means for adjusting the height of the vehicle body. Such means generally takes the form of built-in jacking devices and the like. According to the present invention a height adjusting means is combined with a shock absorbing system in a unit no larger than that required by a conventional hydraulic cylinder which is normally used for the lift adjustment alone.

According to the present invention there is provided a cylinder having a tubular piston rod fitting therein. A valve plate is mounted on this piston rod, and slidably disposed within the tubular piston rod is a free piston. Hydraulic fluid is pumped into the cylinder, and gas is pumped into the piston rod. The free piston serves as a barrier between the hydraulic fluid and the gas, and the initial deflection of the vehicle may be predetermined by the amount of gas pressure. Check valves are provided in the valve plate so that when a sudden shock is applied to the vehicle, the hydraulic fluid can flow easily through the valve plate and the free piston and the pressurized gas will absorb the shock. Upon rebound the check valves are closed and the returning hydraulic fluid is forced to flow through a small orifice in the valve plate, thus cushioning the rebound shock.

The present invention provides means whereby the height at which the vehicle rides may be adjusted. By varying the amount of liquid in the cylinder the relative positions of the cylinder and piston rod may be adjusted. The ride characteristics of the vehicle can be altered by varying the static pressure of the gas. That is to say, with increased gas pressure there will be less initial spring deflection which will produce different ride characteristics than an adjustment wherein the initial gas pressure is decreased so that the vehicle spring deflection is greater for static load conditions.

A primary object of the present invention is to provide hydraulic means for varying the height and lift adjustment of a vehicle and incorporating in such means a means for absorbing sudden loads or shocks.

Another object of the present invention is to provide a means for damping the natural frequency of oscillation by utilizing a valve plate having check valves therein to provide substantially unrestricted flowing in one direction and providing a reduced orifice for flow in the opposite direction.

Other objects and many of the attendant advantages of the present invention will become apparent upon consideration of the following detailed specifications in connection with the accompanying drawings, in which—

FIG. 1 is a cross-sectional view of a suspension strut according to the present invention; and FIG. 2 is a detailed sectional view of a portion of FIG. 1.

Referring now more particularly to the drawing wherein like numerals indicate like parts throughout the several views there is shown in FIG. 1 a cylinder assembly comprising a tube 1 having an end cap 2 welded thereon. The open end of the tubular member 1 is provided with an undercut portion to receive a rod bushing 3 which may be of bronze or similar material. Slidably disposed within the tubular cylinder assembly is a piston rod 4 having a tubular portion 5 as shown. The end portion of the piston rod is enlarged as at 6, and this enlarged portion has a groove adapted to receive sealing means 7. In the disclosed embodiment this sealing means comprises an O ring with a back-up ring disposed on each side thereof. However, the sealing means could be any of the well known types such as penned piston rings, chevron pacing or cup seals. It can be seen that the piston rod is adapted to slide within the cylinder assembly and maintain a sealed relationship therewith.

The end of the piston rod is provided with a valve plate 8 mounted therein. This valve plate is shown more clearly in FIG. 2 wherein it can be seen that the valve plate is provided with a pair of check valves 9 and 10. Each of the check valves is spring loaded so that the liquid may flow from outside the tubular piston rod 5 to the inside of this member, but the valves will close to prevent a flow of fluid from the inside of the piston rod to the exterior thereof. The valve plate is also provided with a reduced orifice 11 for a purpose which will become more fully apparent hereinafter.

Slidably disposed within the tubular portion 5 of the piston rod is a free piston 12. The details of this piston are shown more clearly in FIG. 2 wherein it can be seen that there is provided sealing means 13 and 14 similar to the sealing means 7 previously described. There is also provided a central external groove 15 with a passageway 16 connecting this groove with the chamber between the free piston and the valve plate 8. As this grooved or recessed portion 15 extends around the entire periphery of the free piston and is filled with the hydraulic fluid, assurance is given that pressure on all sides of the free piston will be equalized.

The end cap 2 of the cylinder assembly has a filling port 17 which may be provided with any suitable closure means. This filling port connects with the volume within the cylinder assembly.

The end portion of the piston rod 4 has a passageway 18 into which is fitted a high pressure charging valve for the gas which is adapted to be fed therein into the volume within the piston rod up to the free piston 12.

The operation of the presently disclosed invention is as follows:

Oil or any suitable hydraulic fluid is fed through the port 17 so as to fill the chamber between the free piston and the valve plate and the volume within the cylinder. Prior to this filling operation the piston rod and cylinder assembly are adjusted to the desired length. Gas under pressure is fed through a valve positioned in passageway 18 and the free piston thus forms a barrier between the hydraulic fluid and the gas. The initial spring deflection in the vehicle may be determined by the pressure of the gas within the piston rod. A higher pressure will result in little or no spring deflection, whereas a greater pressure will produce a substantial initial spring deflection. These static conditions will appreciably affect the ride characteristics of the vehicle.

Under shock conditions the load will be substantially increased, and the hydraulic fluid will flow through the check valves in the valve plate and the gas in the piston rod will be compressed to a greater extent. In this manner the shock will be absorbed and on rebound the hydraulic fluid will be forced to pass through the reduced oriffce 11 in the valve plate, thus preventing a sudden rebound shock.

If it is desired to vary the height of the vehicle additional hydraulic fluid may be pumped into the cylinder assembly through the port 17. By this means the height of the vehicle may be determined at any time.

Obviously many modifications and variations of the present invention are possible in light of the above teachings.

What is claimed as new and desired to be secured by Letters Patent is:

A strut adapted to be adjusted in length and having shock absorbing characteristics, said strut adapted to be interposed in the supporting structure for a vehicle and comprising a cylinder, a tubular hollow piston rod slidable in said cylinder, a valve plate mounted on the end of said piston rod within said cylinder, said valve plate having a pair of check valves spring urged to closed position, said valves adapted to open under pressure to permit flow to the interior of the tubular piston rod, a free piston slidable within said piston rod, pressure equalizing means for said free piston, said pressure equalizing means including a pair of ring seals and a recess between said seals around the entire periphery of the free piston and a passageway extending from the recess to one end of the free piston, hydraulic fluid disposed within said cylinder and between said valve plate and free piston and gas under pressure disposed within said piston rod and removable closure means for pumping additional hydraulic fluid within said cylinder to force the piston rod outwardly of the cylinder, the gas within the piston rod providing shock absorbing means and the valve plate damping the natural frequency of oscillation of the shock.

References Cited in the file of this patent

UNITED STATES PATENTS

| | | |
|---|---|---|
| 2,146,089 | Onions | Feb. 7, 1939 |
| 2,155,605 | Levy | Apr. 25, 1939 |
| 2,294,918 | Levy | Sept. 8, 1942 |
| 2,373,505 | Schnell | Apr. 10, 1945 |
| 2,805,853 | Mercier | Sept. 10, 1957 |